United States Patent

[11] 3,614,072

| [72] | Inventor | James H. Brodie<br>2258 Fairmount Ave., Saint Paul, Minn. 55101 |
|---|---|---|
| [21] | Appl. No. | 798,242 |
| [22] | Filed | Jan. 2, 1969 |
| [45] | Patented | Oct. 19, 1971 |

[54] HYDRAULIC FLOW INDUCER
13 Claims, 6 Drawing Figs.

[52] U.S. Cl. .................................................. 261/36, 261/93, 210/170
[51] Int. Cl. .................................................. B01f 7/06, B01d 21/18
[50] Field of Search .......................................... 210/220, 527, 167, 170; 261/DIG. 47, 87, 93, 36

[56] References Cited
UNITED STATES PATENTS

| 1,526,596 | 2/1925 | Greenawalt | 261/87 X |
| 2,116,023 | 5/1938 | Gwidt | 261/87 |
| 2,865,618 | 12/1958 | Asbell | 261/93 |
| 2,928,661 | 3/1960 | MacLaren | 261/87 X |
| 3,160,685 | 12/1964 | Chase | 261/124 |
| 3,206,176 | 9/1965 | Peterson | 210/220 X |
| 3,320,160 | 5/1967 | Welles, Jr. et al. | 261/93 X |
| 3,342,727 | 9/1967 | Bringle | 210/220 X |
| 3,416,729 | 12/1968 | Ravitts et al. | 261/91 X |
| 3,462,132 | 8/1969 | Kaelin | 261/93 X |

*Primary Examiner*—Tim R. Miles
*Assistant Examiner*—Steven H. Markowitz
*Attorney*—Robert M. Dunning

ABSTRACT: A method and apparatus for aerating and propelling sewage in an oxidation channel includes a support designed to extend into the channel in inclined position. A propeller shaft is supported on the support having a screw propeller on one (the lower) end and having a drive mechanism at the upper end above the liquid level. The carrier liquid is circulated in the channel by the propeller. Air is discharged into the liquid on the suction side of the propeller and is drawn into the propeller slipstream for intimate mixing with the liquid.

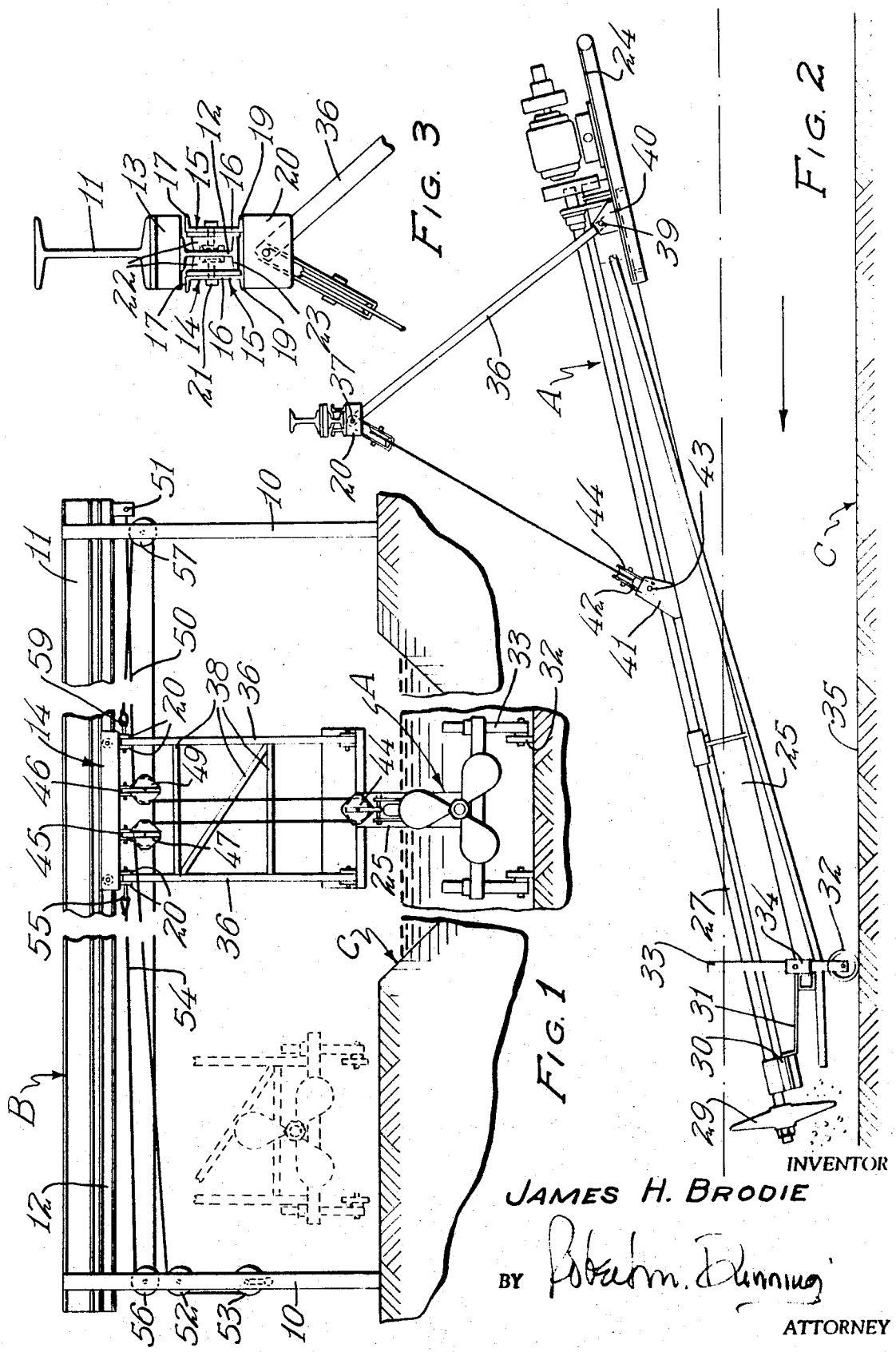

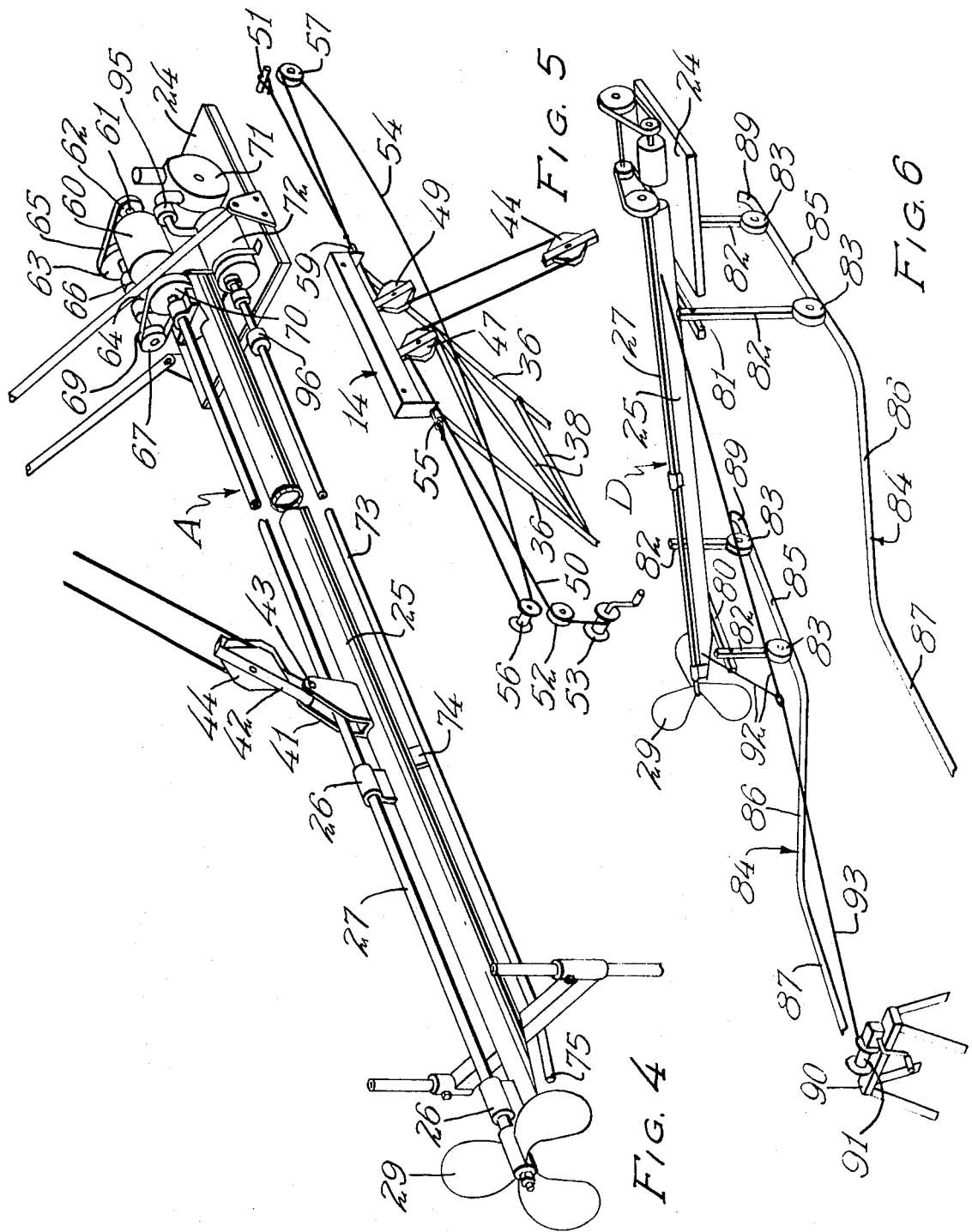

3,614,072

HYDRAULIC FLOW INDUCER

This invention relates to an improvement in method and apparatus for aerating sewage and for propelling it in an oxidation channel to stabilize the same.

The present invention relates particularly to what is commonly known as the channel aeration activated sludge system of sewage treatment. In the treatment of sewage by this method, the object is to obtain the settling of sewage solids and the treatment of unsettleable solids to change them into an inert state so that they can be separated from the liquid carrier. The liquid carrier, mostly water, can then be drained off by flowing in a this layer over the length of a weir as relatively clear water. In the ordinary cycle of treatment provision, the settled solids are disposed of by further treatment in sludge digestion tanks or by hauling away.

This system of treatment depends upon the use of aerobic bacteria to bacteriologically change the nature of these solids. In the oxidation channel type of sewage treatment, aerobic bacteria are supplied with oxygen by dissolving air in the water which constitutes the carrier liquid for sewage solids.

In the past, various types of apparatus have been used to inject air into the carrier liquid. Some of these apparatuses include pipes projecting into the liquid which are connected to an air compressor and which emit bubbles of air which pass through the liquid. Perforated pipes, porous stone and other such devices have been used to diffuse the air into small bubbles to facilitate its solution into the water before it reaches the surface of the water and escapes as free air. Another system widely used is commonly known as surface aeration. In this system some sort of paddle wheel device or other impeller creates turbulence or spray at the surface of the channel which through impact with air absorbs air from the atmosphere and drops it back dissolved into the liquid carrier. Other systems of surface aeration entrap and dissolve atmospheric air into the water by creation of waves. All of these commonly used systems of aeration are relatively inefficient.

Still another system which has achieved a certain degree of success and efficiency is that known as the Passeveer system of brush type of channel aeration and flow induction. Under this system a sort of paddle wheel or "brush" operating at the surface of the channel, performs the twofold function to propel the water around creating a current and at the same time the beating action of the paddle wheels creates spray, waves, and entrapment of air bubbles in the action of the paddle wheel. To increase the aerating effectiveness, the paddle wheel is specially constructed with many small paddles in a form which resembles a rotary brush.

Although this system is more efficient than others under some operating conditions, it has two inherent drawbacks. The velocity of channel flow cannot be maintained constant when the quantity of air being "brushed" into the carrier liquid is being varied. Furthermore, the contact velocity of the brush threshing around in the water is relatively high, which causes breakdown and disintegration of some of the suspended colloidal particles so that they become too small to settle out. This makes it impossible to separate this portion of the sewage waste from the effluent and reduces the effectiveness of the treatment system.

Other propulsion systems using paddle wheels at the surface induce large quantities of air into the carrier liquid. Whereas this is very desirable at some periods of operation, there are periods when it is desired to maintain controlled velocity of channel flow without applying any new air to the solution. So, by ordinary paddle wheel propulsion, over-oxidation can occur.

It should be explained that in the channel aeration systems, the amount of aeration required varies from one portion to the day to another. Depending upon the strength of sewage at a certain time, and the amount of organic sludge material contained in the channel which contains and supports the aerobic bacteria, the quantity of dissolved oxygen in the carrier liquid needed to provide for proper metabolism to balance the life cycle of these bacteria varies over a broad range. Aerobic bacteria like many other living organisms, require a balance of organic nutrition and oxygen for proper metabolism. If the bacteria becomes starved for nourishment due to lack of organic "feed" material furnished by the raw sewage, some of the aerobic bacteria will die. On the other hand, because of their aerobic-type metabolism, the bacteria require oxygen to survive and thrive and if they are starved for oxygen, the will also die. If the bacteria concentration dies off to a population level which is inadequate to consume sewage at the rate it is discharged into the oxidation channel the treatment will suffer and become ineffective. Accordingly, it is an object of the present invention first to create a constant flow in an aeration channel regulated to a velocity which insures the suspension of activated sludge and organic coloidal sewage particles in the mixture. Second, the object is to introduce air at a variable control rate into the propeller stream so the air can dissolve in the carrier liquid while a propeller is inducing hydraulic flow to the oxidation channel. Third, the object is to provide a means of controlling the volume of air dissolved in the carrier liquid, and fourth, to impart the propelling power to the carrier liquid by relatively slow moving propeller blades which minimize hydraulic slippage, and minimize hydraulic sheer between the liquid particles.

For the foregoing reasons, in a channel aeration system it is highly important that the amount of oxygen supplied to the treatment channel be variable and controllable in proportion to the other two important variables, namely, the supply of raw sewage discharged into the treatment plant, and the amount of activated sludge containing live bacteria which are available to consume the sewage and to propagate additional new bacteria.

On the other hand, over aeration will reduce the efficiency and effectiveness of the sewage treatment. Over aeration accelerates the metabolism to such a rate that the bacteria overconsume and completely deplete their available nourishment, causing their own starvation and death. Once the bacteria have died, it is difficult to regenerate their population, taking several days to reestablish equilibrium between bacteria population and supply of raw sewage nutrients. During such time, raw sewage can spill over into the discharge at an unacceptable high level of strength. Another reason to control the amount of air applied to the liquid is that if too much oxygen is applied to the system, an over concentration of oxygen will cause formation of an excess of nitrates and phosphates as generated by the conversion process by the bacteria. This excess will be discharged with the effluent, causing conditions in the receiving public water body of excessive fertilization causing the growth of algae in downstream areas, the opposite of desired action. In is an object of this invention to enable control of conditions to avoid these occurances. For the successful operation of channel aeration system there are four major factors of control, as follows.

In the first place it is necessary to apply the proper velocity of flow to the aeration channel to maintain suspension of the particles of activated sludge so as to keep the working bacteria, the organic nutrition material, and the oxygen supply in a constant state of good proportion and mixture so that there will be uniform contact between the particles of carrier liquid, the dissolved oxygen, the particles of raw sewage, and the bacteria, to enable aerobic bacterial action throughout the entire volume of carrier liquid the dissolved oxygen, the particles of raw sewage, and the bacteria, to enable aerobic bacterial action throughout the entire volume of carrier liquid in the plant. A second major factor of control is to supply the proper amount of air for dissolving the measured amount of oxygen into the carrier liquid at a controllable and variable rate depending upon the metabolism rate of the bacteria farm, and depending upon a supply of nutrients so the bacteria by the raw sewage. A third control factor is to produce propulsion of the carrier liquid in the channel independent of the air supply and without introducing any new air into the solution during times when no additional oxygen is needed. The fourth major control factor is to apply the propelling force to the carrier liquid by relatively slow moving propeller blades without applying excessive shear velocity in the liquid which would tend to disintegrate setteable solids.

Proper turbulence to maintain the solids of raw sewage and of the activated sludge in suspension occurs at a minimum velocity of about 1 foot per second. Below this velocity, settling occurs, and the carrier liquid clears at the surface of the channel so contact is broken between the activated sludge particles which bears the aerobic bacteria and the raw sewage upon which the bacteria feed. Above the velocity of about 1½ feet per second, turbulence becomes excessively violent which causes breakdown and disintegration of suspended colloidal particles. In such a condition, they will not settle out and their removal, which is necessary for effective sewage treatment, becomes impossible. Accordingly, it is another object of the invention to create a gentle turbulent flow within the required narrow limits of velocity between 1 and 1½ feet per second.

Another object of the present invention is to induce the proper flow velocity by applying the slowest and gentlest possible propelling action to the carrier liquid. This requires applying a minimum amount of shearing action and slippage and imparting a minimum of velocity in the slipstream during acceleration of the liquid through the propeller. Therefore, the propeller is made as large in diameter as practical for the depth of the channel, and is turned at the lowest possible speed, thus most effectively satisfying these conditions. To accomplish this result, a large diameter, slow turning screw-type propeller having a relatively low pitch, provides maximum propulsive efficiency with a minimum disturbance to the carrier and thus minimum damage and destruction to the settleable colloidal particles of the sewage.

Various sewage systems have been provided where air is forced below the surface of the liquid by a compressor and allowed to bubble up toward the surface while being dissolved. However, to allow adequate contact time between air bubbles and water particles while the air bubbles flow to the surface to provide for dissolving the air, the air must be pumped deep down under the liquid surface. For example, the air is often released at a depth of about 8 feet. Thus the power for the air compressor must work against this much head pressure. As a result, excessive power is required to pump the air against the hydraulic head pressure to the bottom of the channel.

In such systems, air traveling upwardly in bubbles becomes saturated with water vapor and stabilizes as encapsulated saturated bubbles that do not dissolve beyond the certain extent, but merely rise to the surface and escape to atmosphere. Thus much of the air which is pumped to the required depth merely escapes and the power required is wasted.

Other systems, such as rotating "brushes" and paddle wheels, due to their mechanical configuration and velocity of motion with relation to the carrier liquid, apply violent shearing action to water particles at the surface in contact with the air, causing great turbulence in mixing action between the air and the water particles. This has a bad effect of disintegrating the originally settleable liquids and breaking them up into such small particles that they will not settle out.

In order to get air to dissolve in water, the water and air must be mixed by keeping it for an extended time in a turbulent condition to expose a maximum amount of air particles and water particles to each other. In the present invention, due to the screw action of the propeller, the hydraulic pressure at the suction side of the propeller being less than the static head pressure in the channel, the amount of power to discharge air bubbles ahead of the propeller is less than would be needed to discharge under a static head of the same depth. Furthermore, the relatively large diameter propeller mixes the air with turbulent water over a large diameter slipstream at a relatively shallow depth and at a low head pressure, carrying over an extended length of horizontal travel through the length of the slipstream of the propeller. Thus, the air particles are effectively entrapped in turbulent flow, at shallow depth, and held in this condition over an extended time and distance of travel at a relatively low hydraulic head pressure, giving maximum mixing for solution of air in water at a minimum of air pumping power. The quantity of air so discharged and dissolved can be regulated and controlled by controlling the volume of discharge of the compressor.

These and other objects and novel features of the present invention will be more clearly and fully set forth in the following specification and claims.

In the drawings forming a part of the specification:

FIG. 1 is an end elevational view of an aeration apparatus supported in an open sewage channel by means spanning the channel.

FIG. 2 is a side elevational view of the aeration device in position in the channel.

FIG. 3 is an enlarged detail view of a portion of the supporting means for aerator.

FIG. 4 is a diagrammatic perspective view of the sewage aerating device.

FIG. 5 is a diagrammatic view indicating the manner in which the device may be moved into or out of the channel.

FIG. 6 is a diagrammatic view showing a modified form of aerating device.

The aerating device is indicated in general by the letter A, and is shown supported by a suitable supporting means B over a sewage channel which is indicated in general by the letter C. Under usual conditions, the channel C comprises an endless channel of round or oval shape and is open to atmosphere. The aerating and propelling apparatus A creates a flow of the carrier fluid in the channel so that the fluid circulates continuously. In view of the fact that oxidation channel sewage systems are well known, it will not be described in detail.

As indicated in FIGS. 1 to 5 of the drawings, a pair of substantially parallel standards 10 of A-frame type or the like are provided on opposite sides of the channel C, and these standards support an I-beam or other supporting beam 11 spanning the channel C and at generally right angles thereto. A second I-beam 12 is supported by suitable spacing means 13 beneath the beam 11 and parallel thereto to form a track extending across the channel. A trolley 14 is supported on the track 12. The trolley 14 includes a pair of parallel channels 15 having the webs thereof 16 extending vertically and having laterally extending side flanges 17 and 19 extending outwardly therefrom. The channels 15 are held in spaced parallel relation by downwardly projecting plates 20, the plates 20 being arranged in pairs near opposite ends of the channels 15. Aligned pivots 21 extend through the bases 16 of the channels 15. Aligned pivots 21 extend through the bases 16 of the channels 15 near opposite ends of these channels to support wheels or rollers 22 extending inwardly from the channels 15 and resting upon the bottom lateral flanges 23 of the track 12. Thus the trolley is supported for movement longitudinally of the track.

The propelling and aerating device A includes a platform 24 to which is secured an elongated structural support 25 designed to extend from the platform 24 in a direction longitudinally of the channel C. The support 25 includes a series of aligned bearings 26 which support a propeller shaft 27. A large diameter screw-type propeller 29 having a relatively low pitch is supported on the end of the propeller shaft 27 to rotate in conjunction therewith. The propeller 29 is positioned beyond the outboard end 30 of the tubular support 25. Preferably, the outboard end of the support 25 is tapered as indicated at 31 so as not to obstruct the flow of the liquid toward the propeller. Wheels 32 are mounted on vertically adjustable supports 33 mounted in generally vertical bearings 34 near the outboard end of the support 25. The wheels 32 are designed to rest upon the bottom 35 of the channel C so as to hold the propeller 29 at its desired elevation relative to the bottom of the channel. The wheels permit the lower end of the device A to move along the channel bottom with little resistance during raising and lowering of the same.

A frame including a pair of supporting links 36 are hingedly connected at their upper ends as indicated at 37 between the plates 20 depending from the trolley channels 15. The lower ends of the links 36 are pivotally connected as indicated at 39 to brackets 40 mounted upon the platform 24. Struts 38 connecting the links 36 add rigidity thereto. A pair of bracket plates 41 project in parallel relation in an upward direction from the support 25 intermediate the ends thereto. A U-shaped strip 42 extends about an anchor pin 43 extending between the bracket plates 41 and supports a pulley block 44. As indicated in FIG. 1, the trolley 14 includes a pair of spaced downwardly depending brackets 45 and 46 from which pulley blocks 47 and 49 are suspended. A rope or cable 50 is dead ended as indicated at 51 near one end of the track 12 and extends through the pulley block 49, through the pulley block 44, through the pulley block 47 and about an idler pulley 52 to a winch 53. By operation of the winch 53, the cable will serve to raise the outboard end of the support 25 until this end of the device is about the level of the channel C.

Means are also provided for moving the trolley 14 in a lateral direction so that the propelling and aerating device A may be lifted and moved to one side of the channel C. A cable 54 is dead ended as indicated at 55 to one end of the trolley 14 and passes about a pulley 56 on one of the standards 10. The cable 54 extends across the channel to the other side thereof and passes about a second pulley 57 on the opposite standard 10. The cable 54 is then dead ended at 59 to the end of the trolley opposite that to which the first named end of the cable has been dead ended at 55. Rotation of either pulley 56 or 57 will move the trolley along the track 12.

The platform 24 forms as a support for drive means for rotating the shaft 27 at an adjustable rate of speed. As is diagrammatically illustrated in FIG. 4 of the drawings, the platform 24 supports a drive motor 60 having a drive shaft 61 supporting a pulley 62 connected to the cooperable pulley 63 on a parallel counter shaft 64 by a belt 65. The counter shaft 64 is supported by suitable bearings 66 and supports a pulley 67 connected by a belt 69 to a cooperable pulley 70 on the propeller shaft 27. Quite obviously, the particular drive arrangement illustrated may be varied, the purpose of the showing being to indicate diagrammatically that the motor 60 is connected to the propeller shaft through suitable speed reduction means.

Also diagrammatically illustrated in FIG. 4 is a compressor 71 which supplied air under compression to a suitable storage tank 72 from which it may flow at an adjustable rate of speed and at a desired pressure. An air pipe or hose 73 is connected to the compressor tank 72 and is supported by suitable brackets 74 to extend longitudinally of the support 25. The outlet end 75 of the air pipe 73 terminates in closely spaced relation to the propeller 29. The propeller 29 is designed to rotate in a direction to force the fluid material away from the aerating apparatus, and as a result, the air is released on the suction side of the propeller where the pressure is somewhat less than the static head pressure in the channel at this depth. Accordingly, the amount of power required to discharge the air ahead of the propeller is less than would be needed to discharge under the static head of the same depth. With this arrangement, and by use of the relatively large diameter propeller at a shallow depth, the propeller mixes the air with turbulent water over a relatively large diameter slipstream, carrying over an extended length of horizontal travel through the length of the slipstream of the propeller. As a result, the particles of air are effectively entrapped in turbulent flow at a shallow depth and held in this condition over an extended period of time and distance of travel at a relatively low hydraulic head pressure, thus giving maximum mixing for solution of air in water at a minimum of pumping power. The quantity of air so discharged and dissolved may be regulated and controlled by controlling the volume of discharge of the compressor.

FIG. 6 of the drawings discloses a modified form of construction in which the propulsion and aerating device is indicated generally by the letter D. In view of the fact that the structure D is identical with the device A except for the means of support, the device is merely shown diagrammatically. In the device A, a crossmember 80 is secured to the tubular support 25 and their the propeller supporting end thereof, and a second crossmember 81 is provided secured to the support 25 adjoining the platform 24 or is actually attached thereto. The crossmembers 80 and 81 are provided at their opposite ends with adjustable vertical supports 82 to the lower ends of which flanged wheels 83 are pivoted on parallel axes which are normal to a vertical plane through the axis of the support 25. The wheels 83 are adapted to roll upon tracks 84 which are designed to fit the contour of the wall of the channel C. In other words, the tracks include generally horizontal portions 85 which rest on the bottom of the channel, inclined portions 86 which extend upwardly in inclined relation along a wall of the channel, and generally horizontal end portions 87 which are supported upon the surface of the ground to one side of the channel. The ends of the tracks 84 which are immersed in the channel are provided with upturned ends 89 which limit the extent to which the device D may travel.

A fixed support 90 is mounted on the ground between the tracks 84, and a winch 91 is provided on the support 90. A cable yoke 92 is connected to the supporting tube 95 near opposite ends thereof, and a cable 93 is connected to the yoke and to the drum of the winch 91. By operating the winch 91, the entire aerating propulsion device may be rolled from the ditch, up the incline, and unto the end portions 87 of the tracks where it is completely out of the water.

The means of regulating the pressure and volume of the air being discharged is not illustrated in detail. However, the compressor may include an unloader valve 95 which regulates the pressure of air in the tank 72. The volume of air discharged may be regulated by a valve such as 96 in the discharge line. It is of importance that the air pressure and air volume be adjustable so that the amount of aeration delivered to the sewage be regulated according to existing conditions. It can be important that the speed of the propeller be adjustable to provide the desired rate of flow of the carrier liquid.

I have described the principles of construction and operation of my improvement in method and apparatus for aerating sewage, and while I have endeavored to set forth the best embodiment thereof, I desire to have it understood that changes may be made within the scope of the following claims without departing from the spirit of my invention.

I claim:

1. A fluid treating system for inducing horizontal flow of current at a generally low and constant linear velocity of a sewage liquid which contains suspended colloidal particles, organic material, bacteria and dissolved gases including oxygen comprising an elongated horizontal continuous circuit of an open oxidation channel of a generally constant and U-shaped cross-sectional area, the apparatus including:

- a power source,
- a mechanical transmission connected to said power source and driven thereby,
- shaft means extending longitudinally of said elongated channel on a generally horizontal axis from said transmission and driven thereby,
- a screw-type propeller on said shaft means in spaced relation to said transmission positioned in said channel and rotatable therewith positioned in said channel,
- a supporting structure for holding intact and in proper relation said power source, transmission, shaft means and propeller and aeration means in said channel.

2. The apparatus of claim 1 including means for varying the speed of said powering means to enable the adjustment setting of said constant linear velocity of said liquid to that which produces uniform suspension of said colloidal particles and organic materials throughout the entire volume of said oxidation channel, said linear velocity being adjusted to a velocity low enough so as to minimize the disintegration of said colloidal particles which would reduce and interfere with their settleability in a relatively stagnant tank, separate from the said oxidation channel.

3. The structure of claim 1 and in which said supporting structure includes a platform on which said power source and said transmission are supported,
- a beam secured to said platform and extending therefrom in generally parallel relation to said shaft,
- bearing means on said beam supporting said shaft extending longitudinally of said elongated channel and parallel with the direction of hydraulic force of said propeller,
- said propeller extending substantially the full depth of the channel and said supporting structure holding said propeller with the top extremity of its diameter slightly below the surface of the liquid sewage and the bottom extremity of its diameter slightly above the bottom of the channel.

4. The structure of claim 3 and including downwardly extending means secured to said beam near the end thereof adjacent said propeller extending into contact with the channel bottom to assist in holding said propeller out of contact with the channel bottom.

5. The structure of claim 4 and in which said downwardly extending means includes wheel means supported on an axis transverse of said channel.

6. The structure of claim 3 and including a suspending means including an elevated beam spanning said channel from one side thereof to the other, standards supporting the ends of said elevated beam and means connecting said supporting means to the elevated beam to support the same beneath said elevated beam.

7. The structure of claim 6 and in which said elevated beam includes a track spanning said channel, and a trolley including wheels designed to roll along said track transversely of said channel, said connecting means being secured to said trolley.

8. The structure of claim 7 and including strut means pivotally connecting said platform to said trolley and block and tackle means connecting said trolley to said first-named beam at a point spaced from said platform, said struts means and said block and tackle means being so arranged that the resultant forces of gravity on said supporting means and structure supported thereby, the compressive forces in said strut means due to propeller rotation, and the tension forces of said block and tackle means may act through the center of gravity of the supporting means and structure supported thereby and through a point on the vertical centerline of said trolley.

9. The structure of claim 8 and including means adjoining one of said standards for actuating said block and tackle means.

10. The structure of claim 7 and including means adjoining one of said standards for moving said trolley transversely of said track.

11. The structure of claim 1 and including an air compressor on said supporting means, and an air pipe extending from said compressor to a point near said propeller through which air is discharged into the slipstream of said propeller, and means connected to said compressor to actuate the same.

12. The structure of claim 11 and in which said air pipe terminates on the suction side of said propeller.

13. A method of propelling and aerating sewage in a carrier liquid in a continuous operation channel through the use of a screw propeller supported on an axis extending substantially longitudinally of the open channel, the sewage liquid containing colloidal particles, organic material, bacteria and dissolved gasses including oxygen, the method consisting in the steps of rotating the propeller to produce a turbulent spiral slipstream to move the carrier liquid longitudinally of the channel, and releasing air on the suction side of the propeller in an area where hydraulic pressure is less than in other parts of the open channel, and where the introduction of air induces cavitation causing cavities in the liquid in the channel, wherein the cavities formed by the released air act as multiple bubble chambers for air and water vapor to mix and saturate each other prior to being conducted through the propeller and accelerated along the discharge slipstream and being mixed with the liquid of the open channel.